(12) United States Patent
Uemura

(10) Patent No.: US 8,322,214 B2
(45) Date of Patent: *Dec. 4, 2012

(54) SENSOR DEVICE

(75) Inventor: Takeshi Uemura, Osaka (JP)

(73) Assignee: Panasonic Corporation, Osaka (JP)

(*) Notice: Subject to any disclaimer, the term of this patent is extended or adjusted under 35 U.S.C. 154(b) by 303 days.

This patent is subject to a terminal disclaimer.

(21) Appl. No.: 12/834,419

(22) Filed: Jul. 12, 2010

(65) Prior Publication Data

US 2010/0280794 A1    Nov. 4, 2010

Related U.S. Application Data

(60) Continuation-in-part of application No. 12/615,848, filed on Nov. 10, 2009, now Pat. No. 7,775,109, which is a division of application No. 12/486,227, filed on Jun. 17, 2009, now Pat. No. 7,730,782, which is a continuation of application No. PCT/JP2009/001524, filed on Apr. 1, 2009.

(30) Foreign Application Priority Data

Apr. 4, 2008   (JP) .................................. 2008-097919
Oct. 16, 2008  (JP) .................................. 2008-267024

(51) Int. Cl.
*G01C 19/56* (2006.01)
*G01P 15/00* (2006.01)
(52) U.S. Cl. .................. 73/504.12; 73/514.01
(58) Field of Classification Search ............... 73/504.12, 73/504.14, 504.15, 504.16, 504.04, 504.02, 73/514.01, 1.37, 1.38, 1.77
See application file for complete search history.

(56) References Cited

U.S. PATENT DOCUMENTS

| 3,964,016 A | 6/1976 | Yamada et al. |
| 5,212,640 A | 5/1993 | Matsuda |
| 5,512,890 A | 4/1996 | Everson, Jr. et al. |
| 5,734,087 A | 3/1998 | Yamashita |
| 5,939,630 A | 8/1999 | Nozoe et al. |
| 6,089,091 A | 7/2000 | Nozoe et al. |
| 6,229,402 B1 | 5/2001 | Kataoka et al. ............. 331/34 |
| 6,244,095 B1 | 6/2001 | Nozoe et al. |
| 6,422,088 B1 | 7/2002 | Oba et al. |
| 6,497,146 B1 | 12/2002 | Hobbs et al. |

(Continued)

FOREIGN PATENT DOCUMENTS

DE   10 2006 012 074 A   9/2007

(Continued)

OTHER PUBLICATIONS

Office Action issued in the U.S. Appl. No. 12/693,583 dated on May 31, 2011.

(Continued)

*Primary Examiner* — Helen C. Kwok
(74) *Attorney, Agent, or Firm* — Panasonic Patent Center

(57) ABSTRACT

A sensor device includes a time determining part and an output circuit. The time determining part determines time point information, and adds the time point information to the output supplied from a part subjected to failure diagnosis and related to generation of a failure detection signal, and to the output related to generation of a sense signal. The output circuit outputs the sense signal with the time point information added by the time determining part after the failure detection signal correlated with the sense signal by the time point information is output.

4 Claims, 5 Drawing Sheets

U.S. PATENT DOCUMENTS

| | | |
|---|---|---|
| 6,912,901 B1 | 7/2005 | Nozoe et al. |
| 6,989,771 B2 | 1/2006 | Tokue |
| 7,008,525 B2 | 3/2006 | Morita et al. |
| 7,083,712 B2 | 8/2006 | Morita et al. ............... 205/775 |
| 7,155,974 B2 | 1/2007 | Saito et al. |
| 7,185,532 B2 | 3/2007 | Giustino et al. ............. 73/146 |
| 7,212,953 B1 | 5/2007 | Artiuch ........................ 702/183 |
| 7,233,847 B2 | 6/2007 | Otsuka |
| 7,275,009 B2 | 9/2007 | Yasukawa et al. ............ 702/115 |
| 7,324,909 B2 | 1/2008 | Yasukawa et al. ............ 702/115 |
| 7,463,798 B2 | 12/2008 | Yoshida ........................ 385/18 |
| 7,730,782 B2 * | 6/2010 | Uemura ..................... 73/504.12 |
| 7,775,109 B2 * | 8/2010 | Uemura ..................... 73/504.12 |
| 2005/0000829 A1 | 1/2005 | Morita et al. ................. 205/775 |
| 2005/0216149 A1 | 9/2005 | Kato |
| 2006/0222291 A1 | 10/2006 | Yoshida ........................ 385/18 |
| 2007/0216399 A1 | 9/2007 | Reusing |
| 2008/0216567 A1 | 9/2008 | Breed .......................... 73/146.5 |
| 2008/0236264 A1 | 10/2008 | Sato et al. .................. 73/114.18 |
| 2009/0007663 A1 | 1/2009 | Uemura |
| 2009/0031807 A1 | 2/2009 | Sugibayashi |
| 2009/0138118 A1 | 5/2009 | Inokawa et al. |
| 2009/0210186 A1 | 8/2009 | Siess |
| 2009/0229134 A1 | 9/2009 | Nagase |
| 2009/0249876 A1 | 10/2009 | Uemura |
| 2010/0097088 A1 | 4/2010 | Uemura |

FOREIGN PATENT DOCUMENTS

| | | |
|---|---|---|
| DE | 10 2006 023 213 | 9/2007 |
| DE | 10 2006 023 213 B | 9/2007 |
| EP | 0689055 A | 12/1995 |
| EP | 0689055 A1 | 12/1995 |
| EP | 0773430 A | 5/1997 |
| EP | 1087219 A | 3/2001 |
| EP | 1087219 A2 | 3/2001 |
| EP | 1087219 A3 | 3/2001 |
| EP | 1189025 A | 3/2002 |
| EP | 1455182 A1 | 9/2004 |
| JP | 57-159302 A | 10/1982 |
| JP | 59-113893 U | 8/1984 |
| JP | 06-045969 | 2/1994 |
| JP | 06-098382 | 4/1994 |
| JP | 08-327363 | 12/1996 |
| JP | 09-044798 | 2/1997 |
| JP | 09-079809 | 3/1997 |
| JP | 2001-074503 | 3/2001 |
| JP | 2002-174521 | 6/2002 |
| JP | 2003-252027 | 9/2003 |
| JP | 2004-023279 | 1/2004 |
| JP | 2004-264074 | 9/2004 |
| JP | 2004-301512 | 10/2004 |
| JP | 2005-121576 | 5/2005 |
| JP | 2005-147915 | 6/2005 |
| JP | 2005-283481 | 10/2005 |
| JP | 2005-331332 | 12/2005 |
| JP | 2007-285747 | 11/2007 |
| JP | 2007-305632 | 11/2007 |
| JP | 2008-002890 | 1/2008 |
| JP | 04245081 B | 1/2009 |
| JP | 04289439 B | 4/2009 |
| JP | 04311496 B | 5/2009 |
| JP | 04337952 B | 7/2009 |
| JP | 04358301 B | 8/2009 |
| JP | 4386143 | 10/2009 |
| WO | 96/10807 A | 4/1996 |
| WO | 2007/129494 A1 | 11/2007 |

OTHER PUBLICATIONS

Notice of Reasons for Rejection mailed on Dec. 16, 2008 for Japanese Patent Application No. JP2008-267024.
Office Action issued on Aug. 28, 2009 for the corresponding GB Patent application No. GB0911551.0.
International Search Report of PCT Application No. PCT/JP2009/001524 dated Apr. 28, 2009.
JPO Office Action issued on May 27, 2008 for the corresponding priority Japanese Patent Application No. 2008-097919.
JPO Office Action issued on Feb. 10, 2009 for the corresponding priority Japanese Patent Application No. 2008-097919.
JPO Office Action issued on Dec. 16, 2008 for the corresponding priority Japanese Patent Application No. 2008-267024.
JPO Decision to Grant a Patent issued on Apr. 21, 2009 for the corresponding priority Japanese Patent Application No. 2008-097919.
JPO Decision to Grant a Patent issued on Mar. 10, 2009 for the corresponding priority Japanese Patent Application No. 2008-267024.
Takeshi Uemura, U.S. Appl. No. 12/615,848, filed Nov. 10, 2009.
European Search report of EP 10152210.0 issued on Jun. 18, 2010 (corresponding European application of U.S. Appl. No. 12/693,757).
European Search report of EP 10151727.4 issued on Apr. 27 2010 (corresponding European application of U.S. Appl. No. 12/693,583).
Takeshi Uemura, U.S. Appl. No. 12/693,583, filed Jan. 26, 2010.
Takeshi Uemura, U.S. Appl. No. 12/693,757, filed Jan. 26, 2010.

* cited by examiner

FIG. 2

| $t_{01}$ | $r_{011}$ | $r_{012}$ | ... | $r_{016}$ | $r_{017}$ | $r_{018}$ |
| --- | --- | --- | --- | --- | --- | --- |
| $t_{02}$ | $r_{021}$ | $r_{022}$ | ... | $r_{026}$ | $r_{027}$ | $r_{028}$ |
| $t_{03}$ | $r_{031}$ | $r_{032}$ | ... | $r_{036}$ | $r_{037}$ | $r_{038}$ |
| $t_{04}$ | $r_{041}$ | $r_{042}$ | ... | $r_{046}$ | $r_{047}$ | $r_{048}$ |
| ⋮ | | | | | | |
| $t_{96}$ | $r_{961}$ | $r_{962}$ | ... | $r_{966}$ | $r_{967}$ | $r_{968}$ |
| $t_{97}$ | $r_{971}$ | $r_{972}$ | ... | $r_{976}$ | $r_{977}$ | $r_{978}$ |
| $t_{98}$ | $r_{981}$ | $r_{982}$ | ... | $r_{986}$ | $r_{987}$ | $r_{988}$ |
| $t_{99}$ | $r_{991}$ | $r_{992}$ | ... | $r_{996}$ | $r_{997}$ | $r_{998}$ |

FIG. 3

| $t_{01}$ | $f_{011}$ | $f_{012}$ | | $f_{016}$ | $f_{017}$ | $f_{018}$ |
|---|---|---|---|---|---|---|
| $t_{02}$ | $f_{021}$ | $f_{022}$ | | $f_{026}$ | $f_{027}$ | $f_{028}$ |
| $t_{03}$ | $f_{031}$ | $f_{032}$ | | $f_{036}$ | $f_{037}$ | $f_{038}$ |
| $t_{04}$ | $f_{041}$ | $f_{042}$ | | $f_{046}$ | $f_{047}$ | $f_{048}$ |
| $t_{96}$ | $f_{961}$ | $f_{962}$ | | $f_{966}$ | $f_{967}$ | $f_{968}$ |
| $t_{97}$ | $f_{971}$ | $f_{972}$ | | $f_{976}$ | $f_{977}$ | $f_{978}$ |
| $t_{98}$ | $f_{981}$ | $f_{982}$ | | $f_{986}$ | $f_{987}$ | $f_{988}$ |
| $t_{99}$ | $f_{991}$ | $f_{992}$ | | $f_{996}$ | $f_{997}$ | $f_{998}$ |

SENSOR DEVICE

BACKGROUND OF THE INVENTION

1. Field of the Invention

The present invention relates to a sensor device for use in a vehicle, various types of electronic devices, or the like.

2. Background Art

FIG. 5 is a block diagram of an inertial sensor, which is an example of a conventional sensor device. This sensor device includes driving circuits 1A and 1B, sensing element 2, detecting circuits 3A and 3B, processing circuits 4A and 4B, output circuits 5A and 5B, and failure diagnosing circuit 6. Each of driving circuits 1A and 1B outputs a drive signal. Driving circuits 1A and 1B supplies the drive signals to sensing element 2. Sensing element 2 includes an angular velocity detector and an acceleration detector. Each of detecting circuits 3A and 3B extracts a response signal from sensing element 2. Processing circuits 4A and 4B extract sense signals from the response signals extracted from detecting circuits 3A and 3B, respectively. Output circuits 5A and 5B output the sense signals extracted from processing circuits 4A and 4B, respectively. Failure diagnosing circuit 6 determines whether a part subjected to failure diagnosis is normal or abnormal, and outputs a failure detection signal that is based on the results. At least one of detecting circuits 3A and 3B, processing circuits 4A and 4B, and output circuits 5A and 5B is the part subjected to failure diagnosis.

However, such a conventional sensor device has a problem in improving the reliability thereof. In the above structure, the sense signal is not temporally correlated with the failure detection signal. Thus, the output sense signal cannot be determined precisely in an instant to be a signal in a normal state or a signal at the time of failure. Therefore, it is likely that an object to be controlled according to the output of this sensor device, such as a vehicle, is controlled using a sense signal at the time of failure.

SUMMARY OF THE INVENTION

The sensor device of the present invention includes a driving circuit, a sensing element, a detecting circuit, a processing circuit, an output circuit, a failure diagnosing circuit and a time determining part. The time determining part determines time point information, adds the time point information to an output signal that is related to generation of a failure detection signal from failure diagnosing circuit, and adds the time point information to the output signal that is related to generation of a sense signal. In addition, the output circuit outputs the sense signal with the time point information added by the time determining part after the failure diagnosing circuit outputs the failure detection signal with the time point information which is the same as the time point information added to the sense signal. Alternatively, the output circuit output the sense signal with the time point information added by the time determining part after outputting the failure detection signal with the time point information which is the same as the time point information added to the sense signal, using a time division method.

BRIEF DESCRIPTION OF THE DRAWINGS

FIG. 2 is a chart showing response signals to which time point information is added, in the sensor device of FIG. 1.

FIG. 3 is a chart showing failure detection signals to which the time point information is added, in the sensor device of FIG. 1.

DETAILED DESCRIPTION OF PREFERRED EMBODIMENTS

Figure 1:
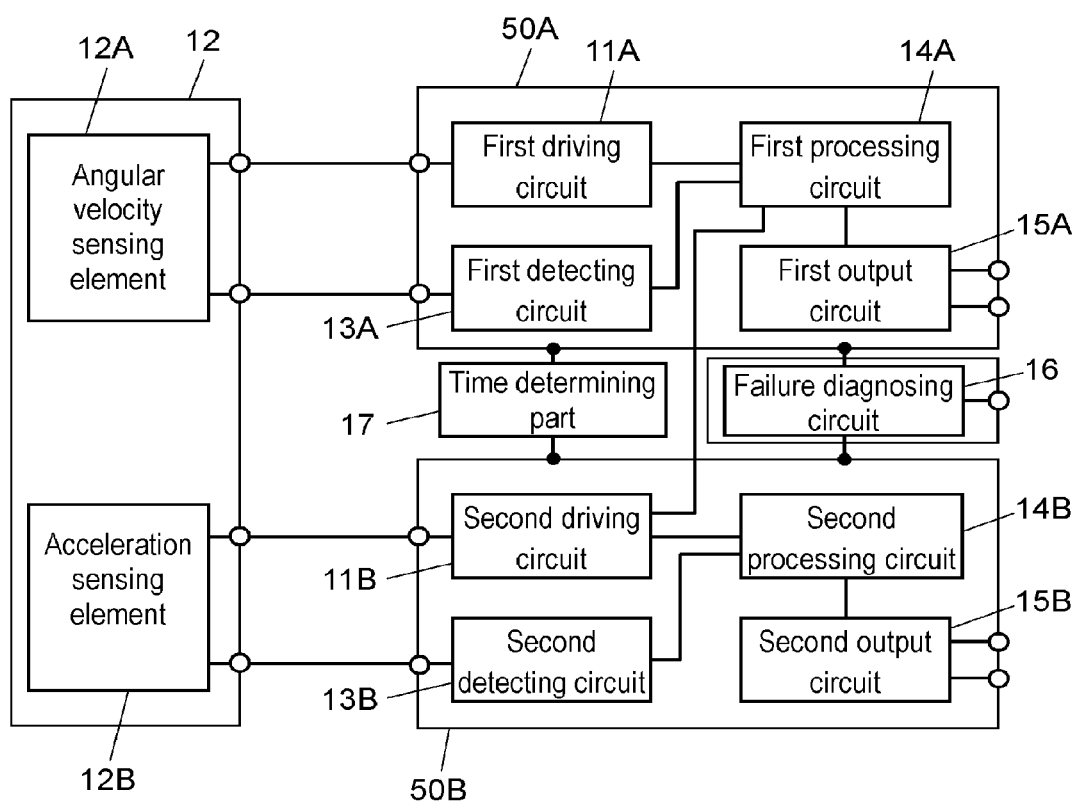
FIG. 1 is a block diagram of a sensor device in accordance with a first exemplary embodiment of the present invention.

FIG. 1 is a block diagram of a sensor device in accordance with a first exemplary embodiment of the present invention. The sensor device of this exemplary embodiment includes first control circuit 50A, second control circuit 50B, sensing element part 12, failure diagnosing circuit 16, and time determining part 17. First control circuit 50A includes first driving circuit (hereinafter "driving circuit") 11A, first detecting circuit (hereinafter "detecting circuit") 13A, first processing circuit (hereinafter "processing circuit") 14A, and first output circuit (hereinafter "output circuit") 15A. Similarly, second control circuit 50B includes second driving circuit (hereinafter "driving circuit") 11B, second detecting circuit (hereinafter "detecting circuit") 13B, second processing circuit (hereinafter "processing circuit") 14B, and second output circuit (hereinafter "output circuit") 15B.

Each of driving circuits 11A and 11B outputs a drive signal. The drive signal from driving circuit 11A is supplied to angular velocity sensing element 12A, i.e. a first sensing element of sensing element part 12. The drive signal from driving circuit 11B is supplied to acceleration sensing element 12B, i.e. a second sensing element of sensing element part 12. Each of detecting circuits 13A and 13B extracts a response signal from sensing element part 12. Processing circuits 14A and 14B extract first and second sense signals from the response signals extracted from detecting circuits 13A and 13B, respectively. Processing circuits 14A and 14B may extract first and second monitor signals at the same time. Output circuits 15A and 15B output the sense signals extracted from processing circuits 14A and 14B, respectively. Failure diagnosing circuit 16 determines whether a part subjected to failure diagnosis is normal or abnormal, and outputs a failure detection signal that is based on the results. At least one of detecting circuits 13A and 13B, processing circuits 14A and 14B, and output circuits 15A and 15B is the part subjected to failure diagnosis.

In the case that processing circuits 14A and 14B extract monitor signals, driving circuit 11A can adjust the vibration amplitude of the first drive signal, according to the first monitor signal from processing circuit 14A. Similarly, driving circuit 11B can adjust the vibration amplitude of the second drive signal, according to the second monitor signal from processing circuit 14B.

Time determining part 17 determines time point information and adds this time point information to the output from the part subjected to failure diagnosis, thereby correlates the failure detection signal with the sense signal, using the time point information. In addition, each of output circuits 15A and 15B outputs the sense signal with the time point information added by time determining part 17 after failure diagnosing circuit 16 outputs the failure detection signal with the time point information which is the same as the time point information added to the sense signal.

As an example, a case where detecting circuits 13A and 13B are parts subjected to failure diagnosis is described with reference to FIGS. 1 through 3. FIG. 2 is a chart showing response signals to which time point information is added, in the sensor device of FIG. 1. FIG. 3 is a chart showing failure detection signals to which time point information is added, in the sensor device.

First, time determining part 17 is electrically connected to detecting circuits 13A and 13B. Thus, time determining part 17 transmits the determined time point information to detecting circuits 13A and 13B. As shown in FIG. 2, when response signals (r011 through r998) are supplied from detecting circuits 13A and 13B, time point information (t01 through t99) is added to the response signals. The response signals (r011 through r998) to which the time point information (t01 through t99) is added are supplied as sense signals from output circuits 15A and 15B, via processing circuits 14A and 14B, respectively. Also at this time, the time point information (t01 through t99) is added to the sense signals.

On the other hand, failure diagnosing circuit 16 determines whether detecting circuits 13A and 13B, i.e. the parts subjected to failure diagnosis, are normal or abnormal. Failure diagnosing circuit 16 outputs a failure detection signal that is based on the results. When detecting circuits 13A and 13B output information on failure detection to failure diagnosing circuit 16, the time point information (t01 through t99) that is the same as the time point information of the response signals (r011 through r998) described above is also added to the output. Thus, when failure diagnosing circuit 16 generates failure detection signals (foil through f998) based on the information on failure detection and outputs the generated signals, the time point information (t01 through t99) is added to the failure detection signals (f011 through f998), as shown in FIG. 3.

With such a structure, the failure detection signals (f011 through f998) can be temporally correlated with the sense signals, using the time point information (t01 through t99). That is, time determining part 17 adds time point information to the output that is supplied from a part subjected to failure diagnosis and is related to generation of a failure detection signal, and to the output that is related to generation of a sense signal. Thus, the failure detection signal is correlated with the sense signal, by the time point information. Therefore, the supplied sense signal can be precisely determined to be a signal in a normal state or a signal at the time of failure. As a result, the possibility that an object to be controlled according to the output of the sensor device, such as a vehicle, is controlled using a sense signal at the time of failure can be reduced. Thus, the reliability is improved.

In addition, each of output circuits 15A and 15B outputs the sense signal with the time point information added by time determining part 17 after failure diagnosing circuit 16 outputs the failure detection signal correlated with the sense signal by the time point information which is added to the failure detection signal and is the same as the time point information added to the sense signal. Therefore, the reliability is more improved. The reason is described in detail.

First, the output information of failure diagnosing circuit 16 is fed back to output circuits 15A and 15B. Then, output circuits 15A and 15B recognize by the feedback that failure diagnosing circuit 16 has output the failure detection signals (f11 to f18) at the time point of t01 shown in FIG. 3. After that, output circuits 15A and 15B output the sense signals at the time point of t01. With this sequence, before output circuits 15A and 15B output sense signals in the abnormal state, failure diagnosing circuit 16 outputs a failure detection signal which is correlated with the sense signals by the time point information and indicates those sense signals are output in the abnormal state. In addition, thanks to the association by the time point information, the failure detection signals (f11 to f18) can be output prior to the sense signals reliably even when some sort of delay occurs in a circuit through which the failure detection signals pass. Therefore, it is possible not to use such sense signals in the abnormal state for controlling a vehicle or the like. As a result, the reliability is more improved.

In this exemplary embodiment, sensing element part 12 is formed of two sensing elements, i.e. angular velocity sensing element 12A and acceleration sensing element 12B. Further, a description is provided of a structure where driving circuits 11A and 11B, detecting circuits 13A and 13B, and processing circuits 14A and 14B are provided as a circuit configuration corresponding to the above two sensing elements. However, the number of sensing elements may be one, and one driving circuit, one detecting circuit, and one processing circuit may be provided as a circuit configuration corresponding to the one sensing element.

In this exemplary embodiment, a description is provided of an example where parts subjected to failure diagnosis are detecting circuits 13A and 13B, which are parts identical with each other in an angular velocity sensing system and an acceleration sensing system. However, the present invention is not limited to this structure. For example, a first part subjected to failure diagnosis may be output circuit 15A and a second part subjected to failure diagnosis may be processing circuit 14B. Such a structure where the two parts subjected to failure diagnosis are not identical with each other in the angular velocity sensing system and the acceleration sensing system can be used. In this case, first time point information common to both of a sense signal from output circuit 15A and information on failure detection supplied to failure diagnosing circuit 16 by output circuit 15A needs to be added to the sense signal and the information on failure detection. On the other hand, second time point information common to both of a sense signal from processing circuit 14B and information on failure detection supplied to failure diagnosing circuit 16 by processing circuit 14B needs to be added to the sense signal and the information on failure detection.

In this exemplary embodiment, one part in each of the angular velocity sensing system and the acceleration sensing system is a part subjected to failure diagnosis. However, failure diagnosing circuit 16 may work on a plurality of parts subjected to failure diagnosis. Specifically, failure diagnosing circuit 16 can be electrically connected to all the circuits of detecting circuit 13A and 13B, processing circuits 14A and 14B, and output circuits 15A and 15B, for example, so that a failure detection signal can be supplied from each circuit. With this structure, a failure that cannot be detected by failure diagnosis in one part subjected to failure diagnosis can be detected by failure diagnosis in a plurality of parts subjected to failure diagnosis. Thus, the precision of failure detection can be improved.

In this exemplary embodiment, angular velocity sensing element 12A and acceleration sensing element 12B are used for explanation. However, the present invention can be implemented for other various types of sensor device, such as a pressure sensor, and a temperature sensor.

It is preferable that each of output circuits 15A and 15B does not output a sense signal that has time point information at the same time point as the time point information of the failure detection signal when failure diagnosing circuit 16 outputs a failure detection signal indicating that a part subjected to failure diagnosis is abnormal. That is, when each of output circuits 15A and 15B receives a sense signal that has time point information at the same time point as the time point information of the failure detection signal, output circuits 15A and 15B prohibit output circuits 15A and 15B themselves from outputting the sense signals. Alternatively, a controller, which is not shown, may be provided so that the controller prohibits output circuits 15A and 15B from outputting the sense signals. Alternatively, output circuits 15A and 15B may output signals at a level at which the output signals cannot be detected by an object to be controlled, such as a vehicle, or the above controller may cause output circuits 15A and 15B to output signals at such a level. The methods are not limited as long as output circuits 15A and 15B substantially output no sense signal.

With this control, the object to be controlled, such as a vehicle, does not need to determine, according to a failure detection signal supplied from the sensor device, whether or not to use the sense signals correlated with the failure detection signal. That is, the object can be prevented from being controlled using the sense signals correlated with the failure detection signal.

In a specific structure, an output-circuit control circuit (not shown) is provided so as to be electrically connected to failure diagnosing circuit 16. Alternatively, an output-circuit control circuit is provided in failure diagnosing circuit 16, or in each of output circuits 15A and 15B. The output-circuit control circuit determines whether or not failure diagnosing circuit 16 has supplied a failure detection signal that indicates abnormality in a part subjected to failure diagnosis. When the output-circuit control circuit determines that a failure detection signal is supplied, the output-circuit control circuit prohibits output circuits 15A and 15B from outputting the sense signals that has the time point information at the same time point as the time point information of the failure detection signal. In this manner, this structure can prevent outputting of the sense signals that have the time point information at the same time point as the time point information of the failure detection signal.

Figure 4:
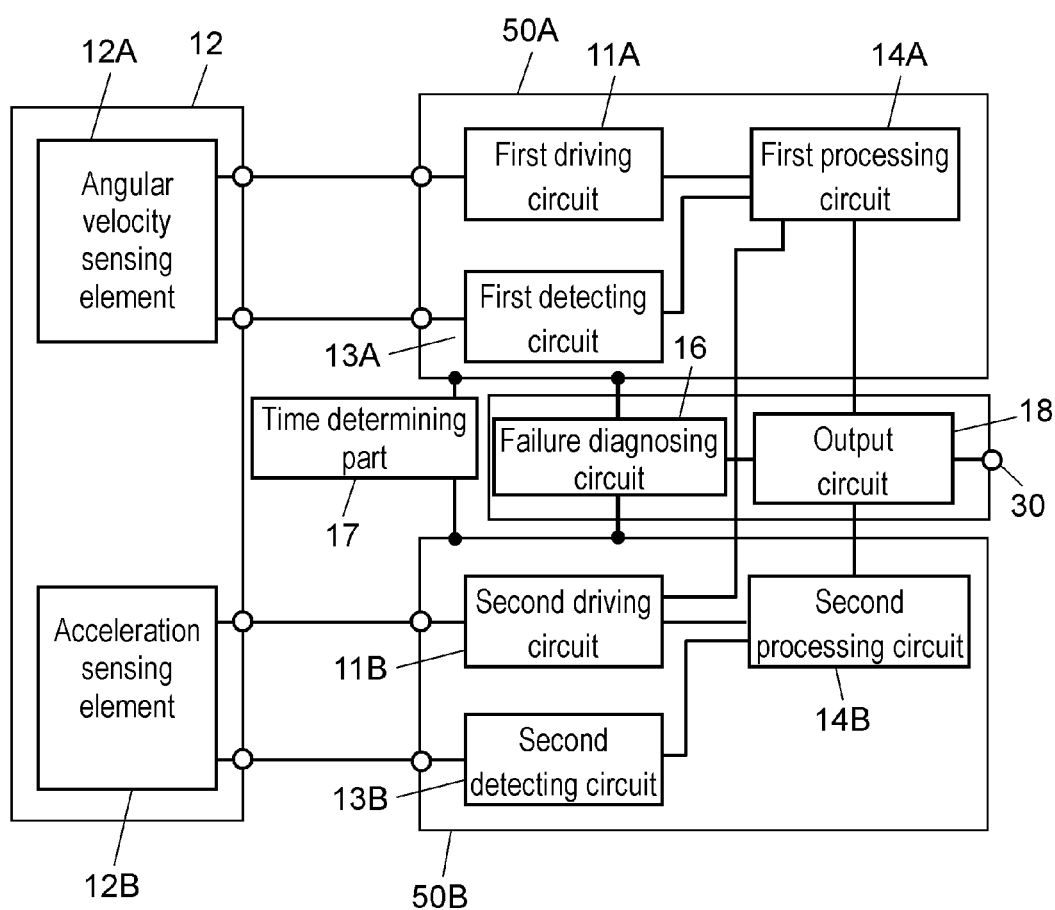
FIG. 4 is a block diagram of another sensor device in accordance with the first exemplary embodiment of the present invention.
Figure 5:
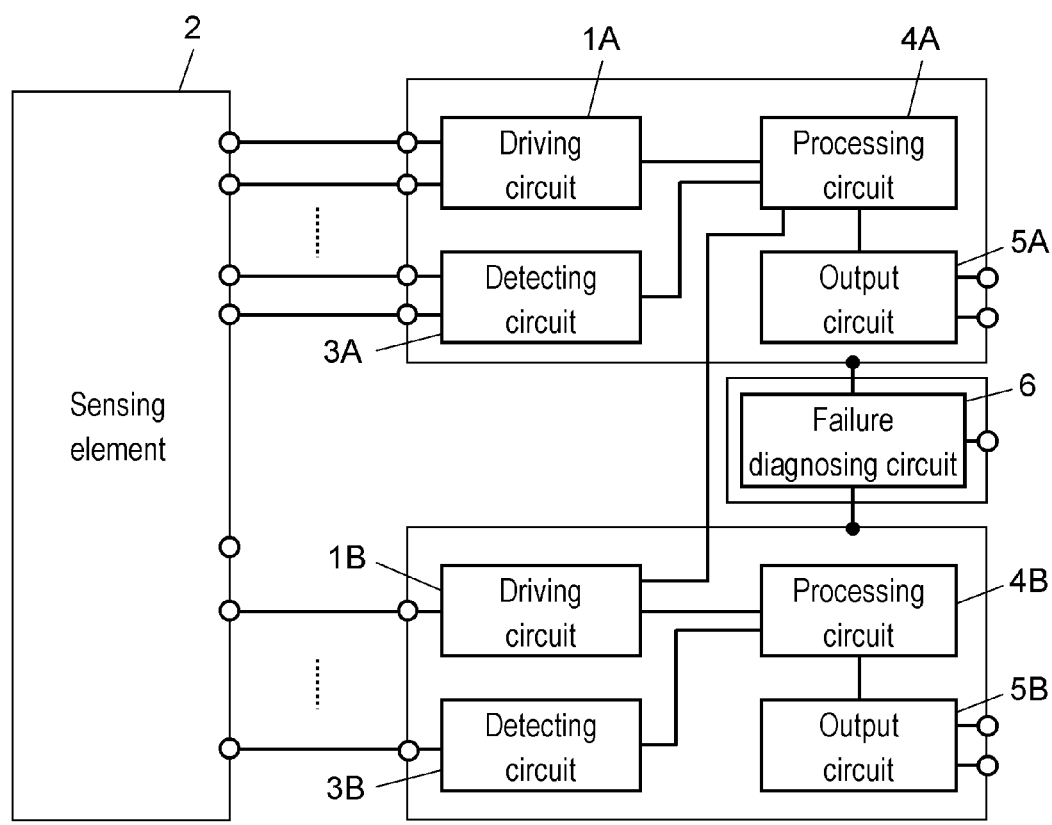
FIG. 5 is a block diagram of a conventional sensor device.

Next, a description is provided of another example of the sensor device of this exemplary embodiment, with reference to FIG. 4. FIG. 4 is a block diagram of another sensor device in accordance with this exemplary embodiment. In this structure, output circuit 18 that outputs first and second sense signals from processing circuits 14A and 14B, respectively, and outputs a failure detection signal from failure diagnosing circuit 16 is shared among the above circuits. Output circuit 18 digitally outputs the sense signals and the failure detection signal, using a time division method. With such a structure, the number of terminals 30 and thus the size of the sensor device can be reduced.

Using a time division method, output circuit 18 couples and outputs the first and second sense signals and the failure detection signal that are correlated with each other by time point information. Thus, on the side of an object to be controlled, the process of coupling the sense signals and the failure detection signals correlated with each other by the time point information can be omitted. Therefore, this structure is preferable.

In addition, output circuit 18 outputs the first and second sense signals with the time point information added by time determining part 17 after outputting the failure detection signal correlated with the sense signals by the time point information which is the same as the time point information added to the sense signals. More specifically, output circuit 18 couples and outputs the first and second sense signals and the failure detection signal that are correlated with each other by time point information using a time division method as described above. The signals are coupled so that the failure detection signals (f11 to f18) at the time point of t01 shown in FIG. 3 are output before the sense signals at the time point of t01 are output. Therefore, before output circuit 18 outputs sense signals in the abnormal state, output circuit 18 outputs a failure detection signal which is correlated with the sense signals by the time point information and indicates the sense signals are output in the abnormal state. In addition, thanks to the association by the time point information, the failure detection signals (f11 to f18) can be output prior to the sense signals reliably even when some sort of delay occurs in a circuit through which the failure detection signals pass. Therefore, it is possible not to use such sense signals in the abnormal state for controlling a vehicle or the like. As a result, the reliability is more improved.

Also in the structure shown in FIG. 4, it is preferable that when failure diagnosing circuit 16 outputs a failure detection signal indicating that a part subjected to failure diagnosis is abnormal, output circuit 18 does not output a sense signal that has time point information at the same time point as the time point information of the failure detection signal. With this control, the object to be controlled does not need to determine, according to a failure detection signal supplied from the sensor device, whether or not to use the sense signals correlated with the failure detection signal. That is, the object can be prevented from being controlled, using the sense signals correlated with the failure detection signal.

In a specific structure, an output-circuit control circuit (not shown) is provided so as to be electrically connected to failure diagnosing circuit 16. Alternatively, an output-circuit control circuit is provided in failure diagnosing circuit 16, or in output circuit 18. The output-circuit control circuit determines whether or not failure diagnosing circuit 16 has supplied a failure detection signal that indicates abnormality in a part subjected to failure diagnosis. When the output-circuit control circuit determines that a failure detection signal has been supplied, the output-circuit control circuit prohibits output circuit 18 from outputting the sense signals that have the time point information at the same time point as the time point information of the failure detection signal. In this manner, this structure can prevent outputting of the sense signals that have the time point information at the same time point as the time point information of the failure detection signal.

Also in the structure shown in FIG. 4, one part in each of the angular velocity sensing system and the acceleration sensing system may be set as a part subjected to failure diagnosis. Alternatively, a structure including a plurality of parts subjected to failure diagnosis can be used. In a structure including a plurality of parts subjected to failure diagnosis, a failure that cannot be detected by failure diagnosis in one part subjected to failure diagnosis can be detected by failure diagnosis in a plurality of parts subjected to failure diagnosis. Thus, the precision of failure detection can be improved.

In this exemplary embodiment, each of the parts subjected to failure diagnosis needs to be a digital circuit, because time point information needs to be added. For this reason, driving circuits 11A and 11B are not included in the parts subjected to failure diagnosis. Further, in the structure of FIG. 4, failure diagnosing circuit 16 is upstream of output circuit 18. Thus, when output circuit 18 fails, the output of the sense signals in an abnormal state cannot be determined whether the output is supplied in an abnormal state or in a normal state. Therefore, in the structure of FIG. 4, output circuit 18 is not included in the parts subjected to failure diagnosis.

As described above, the sensor device of the present invention has an advantage of having improved reliability, and is useful in various types of electronic devices, such as a digital camera and a car navigation system, and in a vehicle.

What is claimed is:
1. A sensor device comprising:
a driving circuit configured to output a drive signal;

a sensing element to which the drive signal from the driving circuit is supplied;

a detecting circuit configured to extract a response signal from the sensing element;

a processing circuit configured to extract a sense signal from the response signal from the detecting circuit;

an output circuit configured to output the sense signal from the processing circuit;

a failure diagnosing circuit electrically coupled to a part subjected to failure diagnosis which is at least one of the detecting circuit, the processing circuit, and the output circuit, the failure diagnosing circuit being configured to determine whether the part subjected to failure diagnosis is normal or abnormal, and to output a failure detection signal based on results of the determination; and a time determining part configured to determine time point information, add the time point information to an output signal related to generation of the failure detection signal, and add the time point information to an output signal related to generation of the sense signal, wherein the failure detection signal is correlated with the sense signal, using the time point information and, the output circuit is further configured to output the sense signal with the time point information added by the time determining part after the failure diagnosing circuit outputs the failure detection signal with the time point information which is the same as the time point information added to the sense signal.

2. The sensor device according to claim 1, wherein, when the output circuit receives the failure detection signal indicating that the part subjected to failure diagnosis is abnormal from the failure diagnosing circuit, the output circuit does not output the sense signal that has time point information at an identical time point with the time point information of the failure detection signal.

3. A sensor device comprising:
a driving circuit configured to output a drive signal;
a sensing element to which the drive signal from the driving circuit is supplied;

a detecting circuit configured to extract a response signal from the sensing element;

a processing circuit configured to extract a sense signal from the response signal from the detecting circuit;

a failure diagnosing circuit electrically coupled to a part subjected to failure diagnosis which is at least one of the detecting circuit and the processing circuit, the failure diagnosing circuit being configured to determine whether the part subjected to failure diagnosis is normal or abnormal, and to output a failure detection signal based on results of the determination;

an output circuit configured to output the sense signal from the processing circuit and the failure detection signal from the failure diagnosing circuit, using a time division method; and a time determining part configured to determine time point information, add the time point information to an output signal related to generation of the failure detection signal, and add the time point information to an output signal related to generation of the sense signal, wherein the failure detection signal is correlated with the sense signal, using the time point information and the output circuit is further configured to output the sense signal with the time point information added by the time determining part after the output circuit outputs the failure detection signal with the time point information which is the same as the time point information added to the sense signal.

4. The sensor device according to claim 3, wherein, when the output circuit receives the failure detection signal indicating that the part subjected to failure diagnosis is abnormal from the failure diagnosing circuit, the output circuit does not output the sense signal that has time point information at an identical time point with the time point information of the failure detection signal.

* * * * *